June 20, 1939.  C. C. TAYLOR  2,162,766
EDUCATIONAL DEVICE
Filed Feb. 2, 1937     5 Sheets-Sheet 1
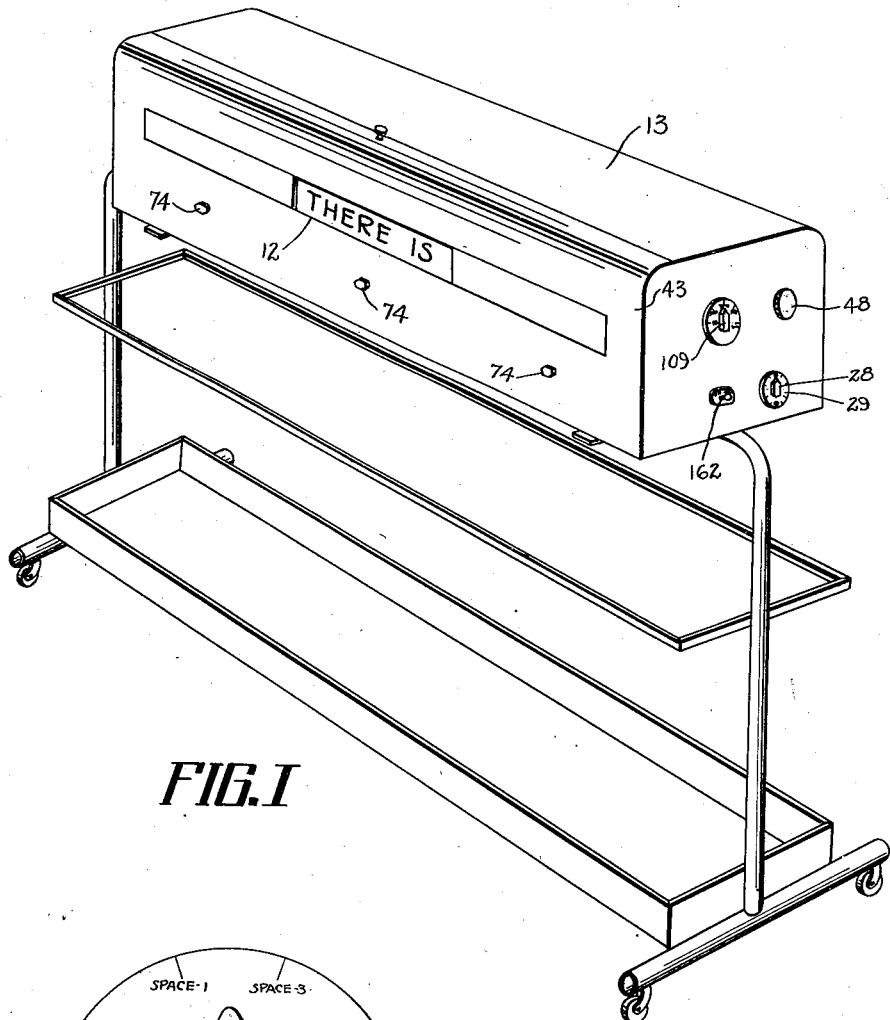
FIG. I
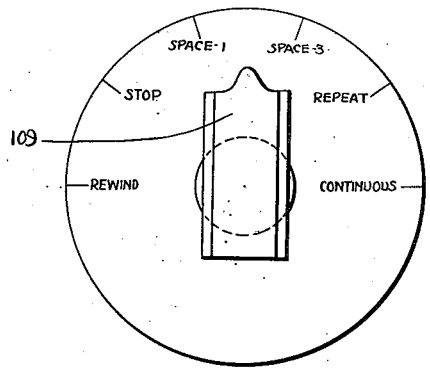
FIG. VI
INVENTOR
CARL C. TAYLOR
BY
Harry H. Styll.
ATTORNEY June 20, 1939.　　C. C. TAYLOR　　2,162,766
EDUCATIONAL DEVICE
Filed Feb. 2, 1937　　5 Sheets-Sheet 2
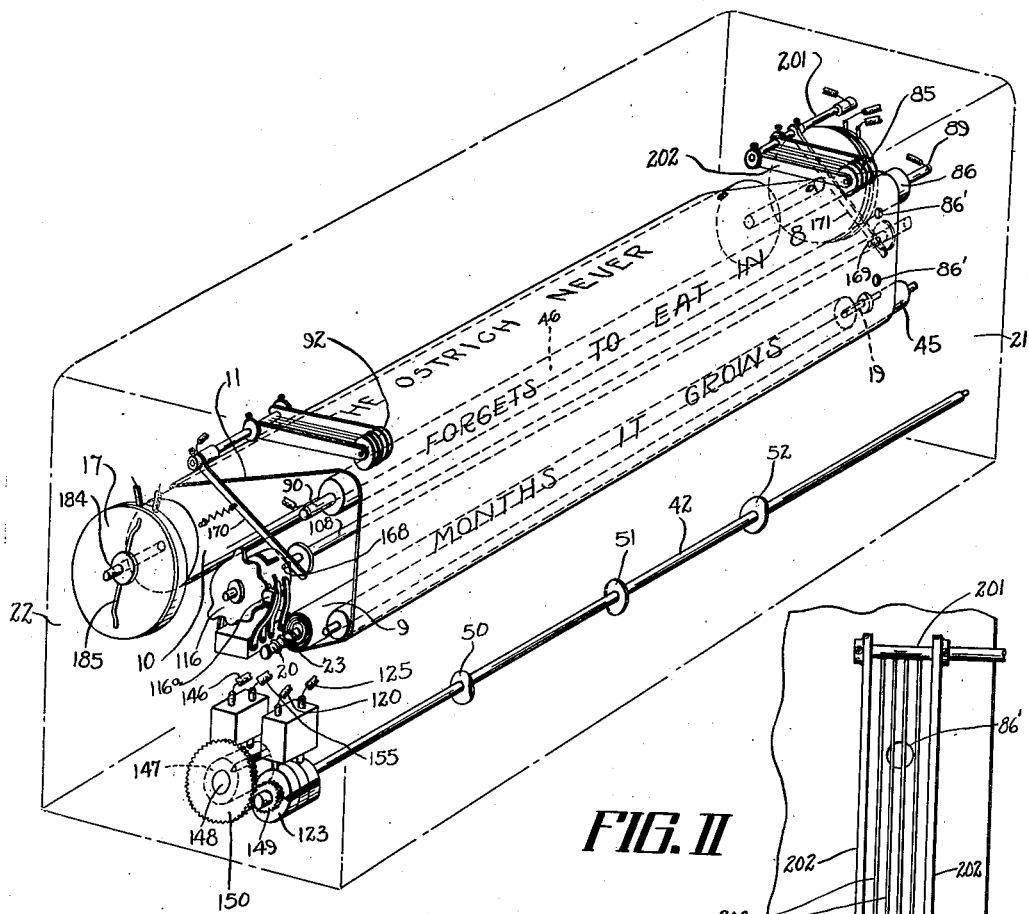
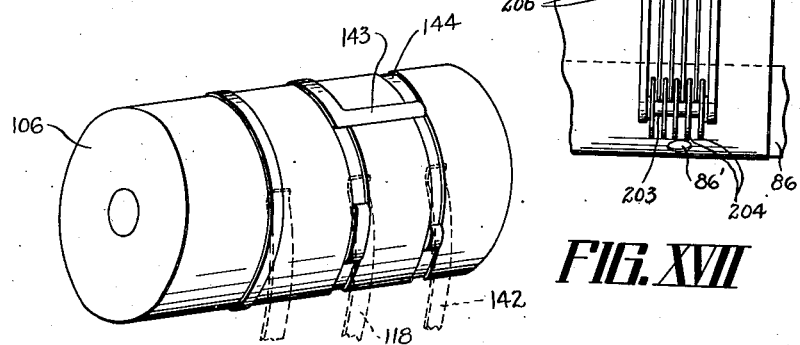
FIG. IX
INVENTOR
CARL C. TAYLOR
BY
Harry H. Styll.
ATTORNEY

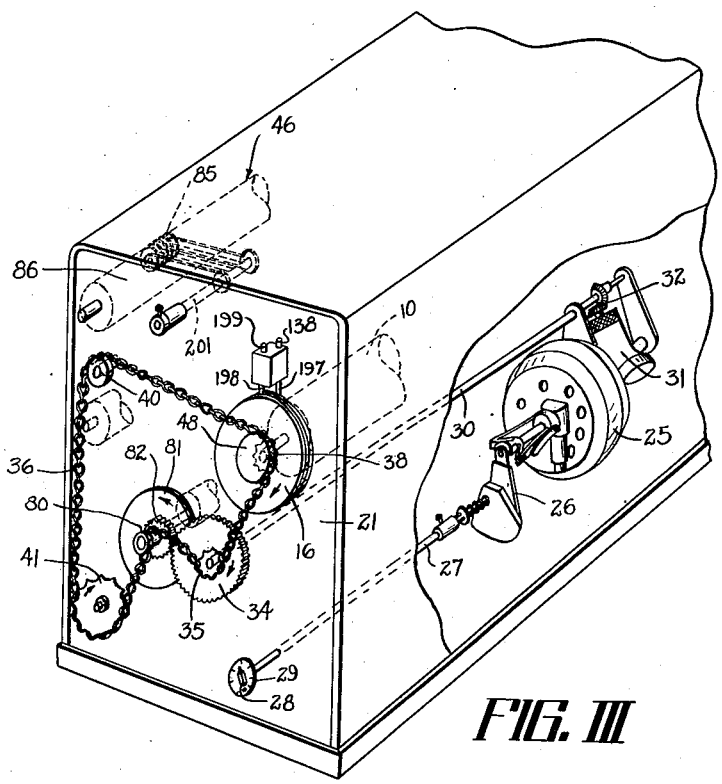
FIG. III
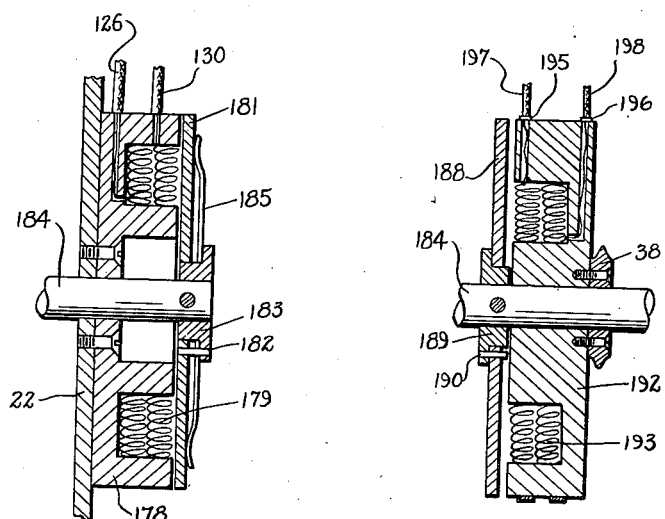
FIG. VII
FIG. VIII
INVENTOR
CARL C. TAYLOR
BY
Harry H. Styll
ATTORNEY June 20, 1939.　　　C. C. TAYLOR　　　2,162,766
EDUCATIONAL DEVICE
Filed Feb. 2, 1937　　　5 Sheets-Sheet 4
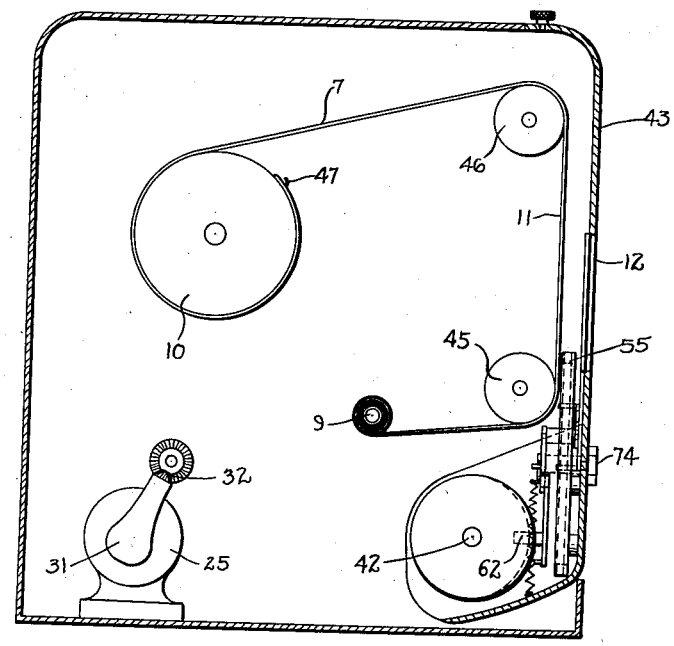
FIG. IV
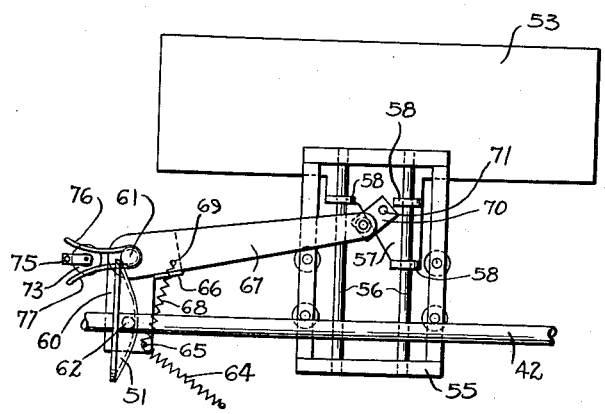
FIG. V
INVENTOR
CARL C. TAYLOR
BY
Harry H. Styll.
ATTORNEY June 20, 1939.  C. C. TAYLOR  2,162,766
EDUCATIONAL DEVICE
Filed Feb. 2, 1937   5 Sheets-Sheet 5
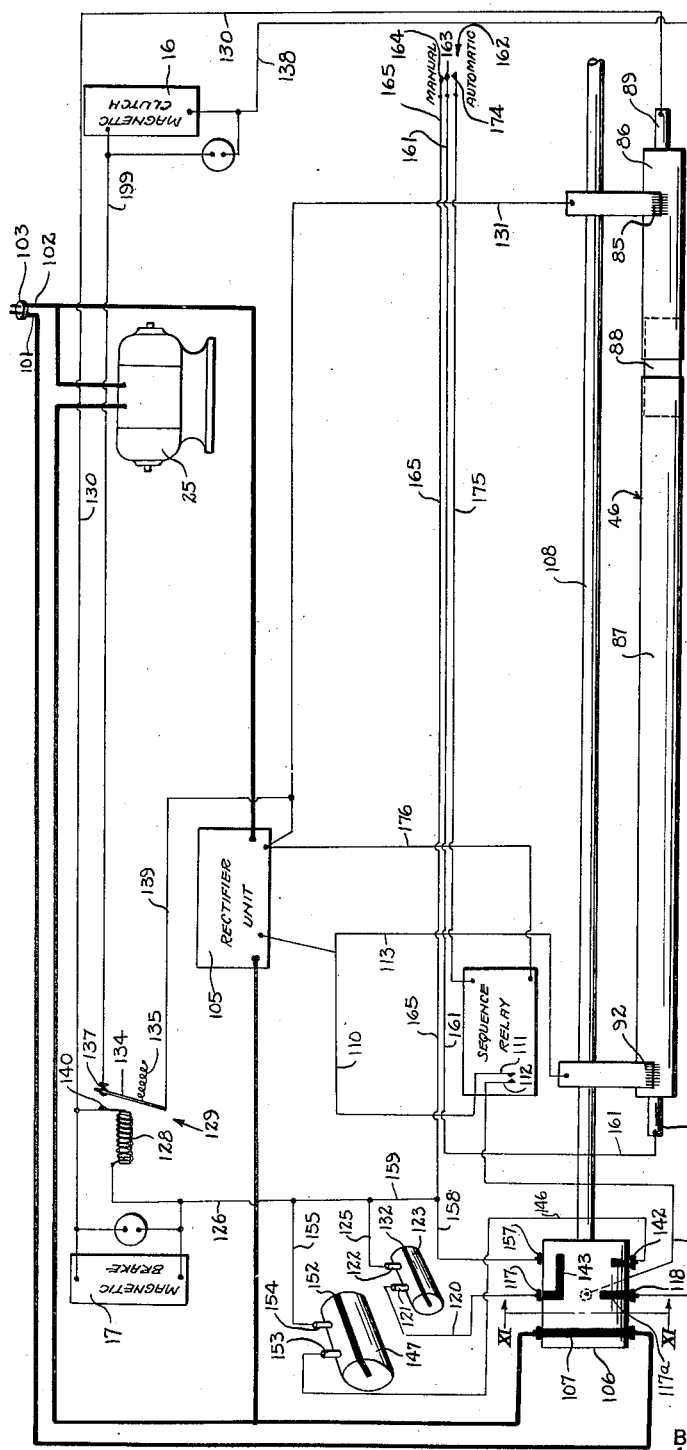
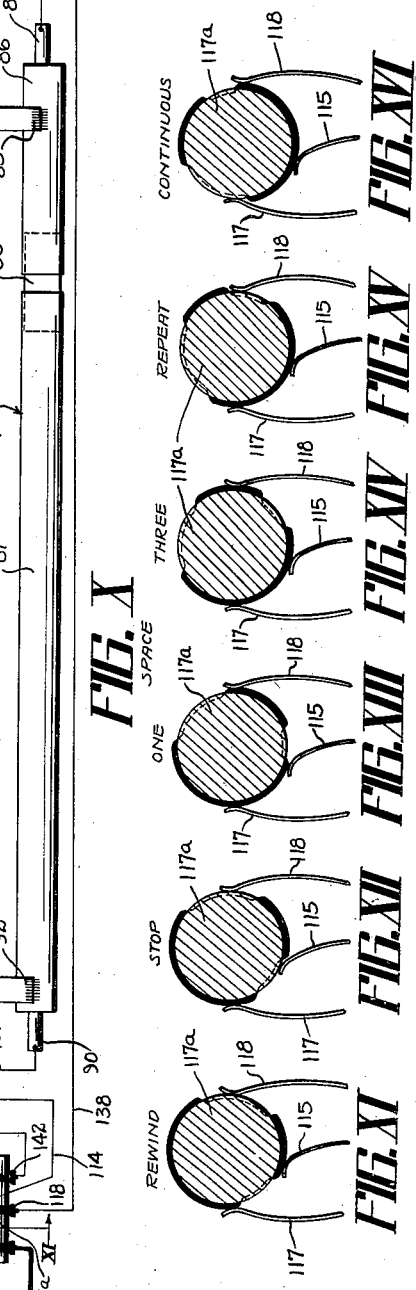
INVENTOR
CARL C. TAYLOR
BY
Harry H. Styll.
ATTORNEY Patented June 20, 1939

2,162,766

UNITED STATES PATENT OFFICE 2,162,766

EDUCATIONAL DEVICE

Carl C. Taylor, Brownwood, Tex., assignor to Educational Laboratories, Inc., Brownwood, Tex., a corporation of Texas Application February 2, 1937, Serial No. 123,641

24 Claims. (Cl. 35—35)

The present invention relates to apparatus for training the eyes to focus on groups of words in a line of reading matter, a mode of reading known as rhythmic reading.

An object of the present invention is to improve the apparatus disclosed in Taylor Patent 1,918,298, patented July 18, 1933, by rendering its operation more nearly automatic and thereby facilitating the use of the apparatus by even unskilled operators.

A further object of the invention is to increase the accuracy of operation of the apparatus so as to insure that the lines of reading matter register with the opening or window in the front of the apparatus.

In the accompanying drawings which illustrate my invention:

Fig. I is a perspective view of the apparatus;

Fig. II is a perspective view of mechanism contained within the casing, the latter being indicated by chain lines;

Fig. III is a fragmentary perspective view similar to Fig. II but taken from the other end of the apparatus;

Fig. IV is a transverse section through the apparatus;

Fig. V is a view in elevation of a shutter and mechanism for operating it;

Fig. VI is a view in elevation of the dial indicating the several positions of the control member;

Fig. VII is a sectional view on the axis of the magnetic brake;

Fig. VIII is a similar view of the magnetic clutch;

Fig. IX is a perspective view on an enlarged scale of the cylindrical rotatable member of the switch controlling the operation of the brake and clutch;

Fig. X is a wiring diagram of the apparatus;

Fig. XI is a sectional view through the rotatable switch member taken on the line XI—XI of Fig. X and showing the relation of the parts for rewinding the exhibitor;

Fig. XII is a similar sectional view showing the stop position;

Fig. XIII is a similar sectional view with the parts in normal spacing relation;

Fig. XIV is a similar sectional view with the parts in relation for spacing each third cycle;

Fig. XV is a similar sectional view with the parts in repeat relation;

Fig. XVI is a similar sectional view with the parts in relation for continuous travel of the exhibitor; and Fig. XVII is a plan view of a contactor which controls halting of the exhibitor to expose successive lines of reading matter or the like.

The apparatus as disclosed in the present application incorporates numerous valuable features of the apparatus disclosed in the above mentioned Patent 1,918,298. Just as in the disclosure of that patent, the present apparatus is provided with shutters which operate serially in timed relation to the step by step advance of the exhibitor. According to the disclosure of the patent, the set of shutters is operated so that after a line of indicia is positioned behind the window, these shutters open serially; and then the exhibitor is advanced to display the next line of indicia.

In the present apparatus provision is made for this same mode of operation, and also for retaining the same line of indicia behind the window while the series of operations of the set of shutters is performed three times. This is sufficient repetition of a particular line so as to be firmly impressed upon the mind of the reader.

With the machine of the patent, rewinding can be effected at any time. The same is true of the apparatus disclosed herein, and the latter has the further advantage that it is necessary merely to turn the control member to the rewind notch to cause rewinding at any time. It is not necessary in order to rewind to swing the front wall of the casing to open position as with the machine of the patent.

The same control member mentioned above will, upon turning to the designated notch, bring about indefinite repetition of the same line of indicia on the exhibitor.

Variation in the speed at which the shutters open and close as the exhibitor is advanced step by step, is brought about by changing the speed of the motor, the motor speed being under the control of a separate control member extending through the casing of the apparatus.

The automatic stopping of the exhibitor at the end of a roll takes place with the apparatus of the present application but in a different manner from that disclosed in the patent above mentioned. A further feature is incorporated in the apparatus of the present application in that, if the operator so elects, automatic rewinding will take place followed by a restarting of the apparatus on the original cycle. This means that with the same exhibitor in the apparatus, the mechanism automatically reverses the direction of movement of the exhibitor at the end of the roll and then restarts the exhibitor from the beginning again.

If at any time the operator wishes to skip a portion of a roll, it is merely necessary to turn the control member to a designated notch in order to bring about continuous winding instead of the intermittent advance of the exhibitor which takes place during normal operation of the apparatus. As soon as the operator reaches the part of the exhibitor which he wishes to display in the normal manner, the normal cycle of operation of the shutters in timed relation to the intermittent advance of the exhibitor can be resumed.

No matter whether the apparatus has been set for continuous advance of the exhibitor, for automatic rewind, or for normal operation, the exhibitor is always stopped at the end of the roll. Of course, if the apparatus has been set for automatic rewind, such rewinding will then take place. Otherwise the exhibitor comes to a stop. The control member has a notch to which it may be turned for stopping the motor at any time.

One of the important features of construction of the apparatus disclosed herein is the arrangement for the drive of a pair of rollers 9 and 10 which operate to advance the exhibitor 11 step by step so as to display the indicia thereon a line at a time through the window 12 in the casing 13 of the apparatus.

The rollers 9 and 10 control the movement of the exhibitor and, according to the broader aspect of the invention, may merely effect the travel of the exhibitor in opposite directions. More specifically, however, the roller 9 is a supply roller and the roller 10 is a winding roller. The driving connections to the latter from the motor 25 include a clutch 16 which is operated alternatively with a brake 17, the latter being on the opposite end of the roller 10 from the clutch in accordance with the present embodiment of the invention. We find it convenient to operate the clutch 16 and the brake 17 electrically, and to cut off the supply of current to one while supplying actuating current to the other.

One end of the roller 9 is engaged by the square end of a stub rewind shaft 19, while the other end is supported by a sliding stud 20. The stub shaft 19 and the sliding stud 20 are journalled in opposite end walls 21 and 22 respectively, the stud 20 sliding in the wall 22 against the tension of a spring 23. The walls 21 and 22, and more particularly the wall 21, afford a support for the actuating mechanism for the rollers 9 and 10 which will now be described, referring first to Fig. III.

The electric motor 25 is controlled as to speed by a governor 26 which is adjustable during operation of the motor by an adjustment screw 27 rotatable by a knob 28 outside the casing 13. The various speeds are indicated by indicia on a dial 29.

A jack shaft 30 is driven from the motor 25 through a speed reducer 31 connected to the jack shaft 30 by a pair of bevel pinions 32. The end of the jack shaft 30 which projects through the wall 21 has secured thereto both a gear 34 and a sprocket 35. The latter serves to drive a chain 36 through which the drive from the motor may be transmitted to the various moving parts of the apparatus, this chain being continuously driven whenever current is supplied to the motor 25. The chain passes about a sprocket 38 secured to one part of the clutch 16 so that when the clutch 16 is so actuated (electrically) as to cause its two parts to be simultaneously rotated, the winding roller 10 is rotated in a clockwise direction (as seen in Fig. III).

The chain 36 also passes over an idler pulley 40 and over a sprocket 41 secured to the cam shaft 42 which extends along the lower front portion of the casing 13. This shaft 42 provides a pivotal mounting for a front wall or door 43 which affords access to the exhibitor 11 so as to permit the removal of one roller 9 and the substitution of another.

The window 12 (see Fig. IV) is formed in the wall 43; and the exhibitor 11 is caused to pass behind this window 12 as unrolled from the roller 9 and rolled up on the roller 10 by guide rollers 45 and 46. When starting an exhibitor after the supply roller 9 has been inserted in the apparatus and mounted on the stub shaft 19 and sliding stud 20, the leading end of the exhibitor is passed around the guide rollers 45 and 46, and a hook 47 on the winding roller 10 is engaged in an eye at the leading end of the exhibitor 11. A knob 48 (see Fig. III) which extends from the end of the apparatus is connected to the winding roller 10 so as to rotate this roller sufficiently to start winding the exhibitor on the roller 10.

Shutters are provided for blanking out successive portions of the window 12 so as to require rhythmic reading of the words or groups of words displayed behind the window 12. In order to operate the shutters serially, the several cams 50, 51 and 52 on the cam shaft 42 are so oriented on that shaft as to give the proper sequence of operation of the shutters. As all of the shutters operate in substantially the same manner, the operation of a single shutter 53 will be described.

A frame 55 secured to the front wall or door 43 carries a pair of slides 56. Each shutter which is preferably formed of sheet material has an integral mounting portion 57 extending downwardly from about the middle of its bottom edge. Ears 58 are struck up from the portion 57 to provide three bearings which cooperate with the slides 56.

Each cam has a low portion on its side for permitting the respective shutter to move upwardly. A rocker 60 is pivoted on the rear of the wall 43 by a stud 61. This rocker carries a cam follower in the form of a roller 62 which is arranged to travel on the side of the cam and adjacent its periphery, and so as to move to the right (as seen in Fig. IV) when riding on the low portion of the cam. A tension spring 64 is secured to the wall 43 and to a pin 65 on the lower end of the rocker 60 so as to pull the follower against the cam and bias the rocker toward the position in which the shutter is elevated.

The other arm of the rocker 60 has a rest 66 which underlies the actuating lever 67 for the shutter 53. This lever is likewise pivotally mounted on the stud 61 and is biased in a clockwise direction toward the rest 66 by a spring 68 connected to the pin 65 and to a second pin 69 on the arm 67. The outer end of the arm 67 is pivotally connected to a link 70 pivoted at 71 to the portion 57 of the shutter. A crank 73 is journalled in the front wall 43 adjacent each stud 61 and each crank 73 is provided with a knob 74 on the outside of the casing for operating the crank. Each crank has a crank pin 75 which is interposed between a pair of lugs 76 and 77 extending from the lever arm 67. Throwing the crank 73 one way or the other swings the lever arm 67 downwardly or upwardly. In this manner any shutter may be locked in raised or lowered position. During normal operation the pin 75 is in central position (as shown in Fig. V)

so as not to interfere with the rocking of the arm 67.

The chain 36 also passes about a guide pulley 80 on the outer end of the stub shaft 19. On the stub shaft 19 between the pulley 80 and the wall 21 is a friction clutch 81 for connecting the stub shaft 19 to a gear 82 which is fixed to one part of this friction clutch 81. The gear 82 meshes with the gear 34 so as to tend to rotate the roller 9 in a direction for rewinding the exhibitor (counter-clockwise as viewed in Fig. III). The friction in the clutch 81 is sufficient to rotate the roller 9 when the roller 10 is released from both the clutch 16 and the brake 17 so as to rotate freely. On the other hand, so long as either the clutch 16 or brake 17 controls the winding roller 10, slipping takes place in the friction clutch 81 between its two parts instead of the gear 82 causing driving of the roller 9.

As has been indicated in the previous description of the invention, the exhibitor 11, after its leading end has been hooked to the winding roller 10, moves step by step or line by line past the window 12. During reading of a particular line as revealed by the serially lowered shutters, the winding roller 10 is held stationary by the magnetic brake 17. Meanwhile the exhibitor 11 is held taut because the friction clutch 81 tends to rotate the roller 9 in a rewind direction. The length of time the brake 17 holds the roller 10 stationary is controlled by a circuit breaker (later to be described) which temporarily renders the brake 17 inoperative and the clutch 16 operative. The exhibitor 11 starts to travel. The circuit breaker has broken the supply of current to the brake only temporarily; but the current supplied thereto is restored only when contact can be made between a contactor 85 and the periphery of a portion 86 of the upper guide roller 46. From Fig. X it will be understood that the guide roller 46 is in two metal parts 86 and 87 connected by an insert 88 of insulating material. The trunnions 89 and 90 by which the guide roller 46 is rotatably supported in the end walls 21 and 22 serve to carry the current from these portions 86 and 87. The exhibitor 11 is itself an insulating medium between the contact or 85 and the portion 86. Perforations 86' are cut through the exhibitor 11 in registry with the contactor 85 and at such intervals as to properly position each line of reading material behind the window 12. As soon as contact is made through a perforation from the contactor 85 to the portion 86, the supply of current to the brake 17 is restored and the winding roller 10 is arrested. In normal operation, the roller 10 is held stationary by the brake 17 until the timing device, above referred to, again breaks the circuit supplying current to the brake.

If both the brake 17 and the clutch 16 are cut off from their source of current, rewinding takes place without the intervention of any other instrumentality, because the friction clutch 81 is instantly available to establish the drive to the roller 9 for rewinding the exhibitor 11. A contactor 92 similar to the contactor 85 is arranged at the opposite end of the guide roller 46 for cooperating with the portion 87 thereof when slots cut in the exhibitor 11 in registry with the contactor 92 permit current to pass between the contactor and the portion 87 of the guide roller. With these preliminary explanations the wiring diagram shown in Fig. X will be explained so as to make clear the various operations of which the apparatus is capable.

The usual flexible cable having the lead in wires 101 and 102 is provided with the usual plug 103. The diagram shown is for use with either alternating or direct current; and as the brake, the clutch, and the portion of the electrical system which has control functions are designated for direct current, a rectifier unit 105 is incorporated for rectifying current for these purposes in case what is used is A. C. The motor 25 may be designed for A. C., or may be of the universal type which runs on either A. C. or D. C. To distinguish the circuits, the alternating current brought in by the leads 101 and 102 is indicated in heavier line than the current provided for the remainder of the apparatus by the rectifier unit 105. Of course, if the leads 101 and 102 bring in direct current, the rectifier unit 105 has no function and the entire system runs on direct current. In such case, however, provision, as shown in the diagram, should be made for full-wave rectification, or with half-wave rectification care should be taken to plug in with the correct polarity in order that the positive flow of the current will be lead into the rectifier unit. The main control switch 106 controls not only the control circuit but also includes a switch 107 for making and breaking the circuit supplying current to the rectifier unit 105 and the motor 25. A rod 108 extends the length of the apparatus to a knob 109 at the end of the apparatus at which the other controls, including the speed control 28, are positioned. When the knob 109 is turned to the position indicated by the word "Stop", the circuit supplying alternating current to the motor 25 is broken by the switch 107 halting the apparatus as an entirety. (Compare Figs. VI and X.)

Starting to trace the control circuit from the rectifier unit, the current may flow either along a wire 110 to one of a pair of contacts 111 and 112 of a sequence relay, or along a wire 113 to the contactor 92. Assuming that the contacts 111 and 112 are closed, the current flows along a wire 114 to a contact 115 of the main switch 106. A notched disc 116 on the end of the rod 108 is engaged by a spring pressed roller 116a for yieldably positioning the switch in the several control positions. Assume that the switch 106 has been turned from "Stop" position to the next notch which is arranged for normal operation of the apparatus. Contact 115 engages the metal segment 117a arranged centrally in the switch, and current can flow through contacts 117 and 118, the former leading to the brake 17 and the latter to the clutch 16. (See Fig. XIII.)

Assuming that the parts are in such relation that current may flow to the magnetic brake, such flow takes place along the wire 120 and from one of the points 121 to the other point 122 through the cylindrical metal member 123 of the circuit breaker, then through the wires 125 and 126. The current then flows in parallel through the magnetic brake 17 and through the coil 128 of a relay indicated in general by the numeral 129. The circuit is completed through the wire 130, the trunnion 89, roller portion 86, contactor 85 and wire 131 which leads back to the rectifier unit 105. The cylindrical member 123 of the circuit breaker includes a segment 132 of insulating material; and this member 123 is fixed on the end of the cam shaft 42 so as to continuously rotate with the cam shaft. (See Fig. II.) Accordingly, at the proper time in the cycle of operations of the shutters, the control circuit through the magnetic brake 17 and relay 129 is broken and the armature 134 is pulled away from the core of the relay by the tension spring 135 so as to engage a contact 137. Current flow can now take place from the switch contact 118 through wire 138 and the magnetic clutch 16 back to the rectifier unit through contact 137, armature 134 and wire 139.

The energizing of the clutch 16 causes the roller 10 to advance the exhibitor 11 until contact is once more permitted between contactor 85 and roller portion 86 through a perforation 86′ in the exhibitor 11. Such contact causes current flow through the winding 128 of the relay 129 so as to break the circuit through the magnetic clutch at contact 137 by drawing the armature 134 toward the core of the relay 129. It will be noted that when the armature engages the contact 140, the circuit through the wire 130 and contactor 85 is shorted due to the current flow through the armature 134 and wire 139 directly to the rectifier unit 105. Of course the contact through the perforation 86′ has also brought about current flow through the brake 17; so that as soon as the perforation 86′ is reached in the travel of the exhibitor, the clutch 16 is deenergized and the brake 17 is simultaneously applied.

This arrangement has solved the difficult problem of surely halting the exhibitor, using perforations which are small enough not to materially weaken the paper or other material of which the exhibitor is made. From one point of view the perforations 86′ are merely trips, as continued current flow through the wire 130 and contactor 85 is not necessary for maintaining the brake 17 applied to the roll 10. Once the armature 134 is pulled over to release the clutch 16, the former is latched in engagement with contact 140 by the current flow through the coil 128 and wire 139; so that it makes no difference whether the brake 17 acts fast enough to stop the exhibitor with the contactor still making contact with the roller portion 86 through a perforation. This is of importance because if the apparatus is being operated at one of its higher speeds, it may be difficult to obtain such quick action on the part of brake 17 as to stop the exhibitor with the contact through a perforation 86′ still effective, especially where the perforations are as small as is desirable.

Should the operator desire to repeat the same line of indicia on the exhibitor 11 three times, he rotates the switch 106 to the next notch with the result that another contact 142 is connected in the control circuit. Examining the switch 106 (Fig. IX) it will be noted that a bridge 143 connects the central segment 117a to the parallel segment 144. The switch 106 has now been rotated to a position where the segment 144 brings into the circuit the contact 142 which supplies current through wire 146 to a second circuit breaker. This second circuit breaker includes a rotatable cylindrical member 147 mounted for rotation on a stud 148 with its axis parallel to the cam shaft 42. Intermeshing gears 149 and 150 are secured respectively to the cam shaft 42 and the cylindrical member 147, these gears having a three to one ratio so that the cylindrical member 123 makes three complete revolutions for one complete revolution of the cylindrical member 147. The latter has an insert 152 of insulating material in similar fashion as the cylindrical member 123, so as to break the circuit through the points 153 and 154 at the same time that the circuit through the points 121 and 122 is broken. The circuit including the points 153 and 154 is completed to the wire 126 through the wire 155. After each complete cycle of the shutters, the circuit including contact 117, wires 120, 125 and 126 and the points 121 and 122 is broken by the insulation 132; but only once in three complete cycles is the circuit simultaneously broken through the wires 146 and 155 and the points 153 and 154. It is, therefore, only once in three complete cycles of the shutters that current flow through the brake and through the winding 128 is broken to permit the armature 134 to swing against the contact 137 so as to energize the clutch 16 and advance the exhibitor 11 to the next line of indicia.

Rotation of the switch 106 to the next notch moves the central segment 117a and the bridge 143 to such a position as to bring into the circuit still another contact 157. This permits direct flow from wire 114 through the central segment 117a, the bridge 143, contact 157, wire 158 and wire 159 to both the magnetic brake 17 and the winding 128 of the relay 129. This shorts the circuit through the points 121 and 122 of the circuit breaker so that the breaking of the circuit between these points has no effect. In other words, current flow is maintained continuously through the magnetic brake and the winding of the relay so as to hold the roller 10 stationary as long as the switch is maintained in this, the "repeat" position.

In passing, it will be noted that the same effect is brought about by current flow to the wire 159 by way of contactor 92 (such flow of current taking place only in case the contactor 92 comes into contact with the roller portion 87, as when one of the above mentioned slots in the exhibitor 11 is reached). In order that such current flow through the contactor 92 may take place, the current supplied from the rectifier unit 105 through wire 113 flows from the roller portion 87 through the trunnion 90 and wire 161 to a control switch 162 which is of the single pole double throw type.

Under the conditions now assumed (which we will call "manual control") the switch lever 163 has been moved so as to complete the circuit through the contact 164. This means that current may flow through the wire 165 to the wire 159. The purpose of such a circuit through the contactor 92, the switch 162 and wire 165 so as to supply current both to the brake 17 and the relay 129 will be later explained.

From the "repeat" position, the switch 106 can be rotated one more notch into a position which is indicated by the word "Continuous". In this position the central segment 117a completes a circuit only between the contacts 115 and 118. As no current can flow through the winding 128 of the relay 129, the circuit through wires 138 and 139 by way of contact 137 and armature 134 is continuously maintained. This means that the magnetic clutch 16 is continuously actuated to bring about continuous rotation of the roller 10. No flow of current through the switch 106 can take place to the winding 128.

But as above mentioned, current flow can take place through contactor 92 if a slot in the exhibitor 11 is reached; and such a slot is so made in the exhibitor as to be reached at or adjacent the end of a roll. As soon as this slot in the exhibitor 11 is reached, the circuit to the winding 128 is completed through contactor 92 so as to discontinue the supply of current to the clutch 16 and apply the brake 17.

There are two ways in which rewinding can take place. Again assuming that the switch 162 is in the position termed "manual control" in which contact is made with contact 164, the effect of reaching the slot near the end of the roll is to apply the magnetic brake 17. The operator now rotates the switch 106 through 180° to the notch beyond "Stop" position, this notch being indicated by the word "Rewind". In this position of the switch 106 the central segment 117a supplies current to neither the brake 17 nor the clutch 16. The contact 118 is at this time out of engagement with this central segment 117a; while current flow through either the contactor 85 or the contactor 92 is prevented by their being elevated out of contact with the guide roller 46. Movement to elevated position is brought about by eccentric pins at 168 and 169 carried by the rod 108 of the switch 106. (See Fig. II.)

Lever arms 170 and 171 connected respectively to the contactors 92 and 85 are engageable by the pins 168 and 169 respectively. As is clear from Figs. II and X, both contactor 85 and contactor 92 are pivotally mounted so that the lever arms 170 and 171 can swing them to elevated position when the rod 108, in rotating to "rewind" position, brings the eccentric pins 168 and 169 into contact with the lever arms 170 and 171. Accordingly in "rewind" position of the rod 108 and switch 106 which form part of a main control member, both the brake 17 and the clutch 16 are de-energized so that the friction clutch 81 may bring about rotation of the roller 9 to rewind the exhibitor 11.

This brings about complete rewinding of the exhibitor and detachment of its leading end from the hook 47. This is in contrast to the operation of the apparatus when the switch 162 is thrown from the position above mentioned to its other position which we will term "automatic control". In this position the switch lever 163 engages the other contact 174 so that instead of a circuit including the wire 165, a circuit is provided including a wire 175 leading to the sequence relay referred to at the beginning of the description of the wiring diagram. From the sequence relay this circuit may be completed to the rectifier unit by way of a wire 176.

We will now assume that with the switch 162 in "automatic control" position the contactor 92 rides onto the slot adjacent the end of the roller and makes contact with the roller portion 87. A circuit is now completed through wire 113, contactor 92, roller portion 87, trunnion 90, wire 161, contact 174, wire 175, the sequence relay and wire 176. This breaks the circuit through contacts 111 and 112. The supply of current to the contact 115 is therefore cut off, and no current flow can take place through the switch 106 to either the brake 17 or the clutch 16. Accordingly both of these are de-energized. Since as has been above noted, the drive chain 36 operates continuously so long as the motor 25 is actuated, the friction clutch 81 ceases to slip and immediately the chain 36 drives the roller 9 in the rewinding direction by virtue of the driving connection through the gears 34 and 82 and the friction clutch 81.

In this way the supply of current to the sequence relay by way of the wires 161 and 175 brings about automatic rewinding. The travel of the exhibitor 11 during rewinding breaks the contact between the contactor 92 and the roller portion 87 so that the sequence relay is set for the second stage of its operation. This second stage occurs when a circuit is again established through the contactor 92, the roller portion 87 and wires 161 and 175; and in this second stage the contacts 111 and 112 are again closed. In order that there may be such current flow through the contactor 92, the exhibitor 11 has a slot near its beginning end in registry with the contactor 92; and therefore when the roll is nearly completely rolled up on the roller 9, the contactor completes the above mentioned circuit by engaging the roller portion 87 through this slot to cause closing of the main control circuit at the contacts 111 and 112 as above indicated. The closing of the contacts 111 and 112 of course restores the mechanism to the condition in which it was at the time when the slot adjacent the end of the roll caused actuation of the sequence relay so as to start rewinding.

It is apparent therefore that the sequence relay is simply intended to alternatively open and close the contacts 111 and 112, the relay being reset for its other mode of operation each time it is cut in and out of the circuit including the wires 175 and 176. The usefulness of this sequence relay is in first discontinuing the flow of current through the main control circuit when the end of a roll is reached, and then reestablishing the flow of current through the control circuit when the beginning of the roll is in position for a repetition of its passage past the window 12.

It is not necessary for proper operation of the mechanism that a particular construction of magnetic brake or a particular construction of magnetic clutch be employed. The drawings illustrate in Figs. VII and VIII a suitable construction of each. The brake which is shown in Fig. VII includes an armature 178 secured to the wall 22 and provided with sufficient windings 179 to establish the required magnetic effect. The current is supplied to these windings by the wires 126 and 130. A plate 181 is connected by a stud or pin 182 to a hub 183 fixed to the shaft 184 of the roller 10. A leaf spring 185 biases the plate 181 toward the armature, this plate being free to move longitudinally of the hub but being prevented by the pin 182 from rotating relative thereto.

The clutch which is illustrated in Fig. VIII comprises a driving member 188 in the form of a plate connected to a hub 189 by a pin 190. The hub is in turn fixed to the shaft 184 of the roller 10. This construction permits the plate 188 to move longitudinally of the hub without permitting relative rotation between the plate and hub. The driven member 192 of the clutch is in the form of an armature furnished with windings 193. The drive sprocket 38 is fixed to the armature 192 so as to rotate the same whenever the chain 36 is in motion. The armature is journalled on the shaft 184 and is free to rotate relative thereto except when current is supplied to the collector rings 195 and 196 from the contacts 197 and 198 supplied with current from the wires 138 and 199 respectively.

The construction of contactor illustrated in Fig. XVII is flexible in operation and of advantage in ensuring adequate contact even though there be some weaving of the exhibitor. A pivotally mounted bar or bracket 201 is carried by the end wall 21; and from the bracket 201 project forwardly two parallel arms 202. An axle 203 connects the forward ends of the arms 202, and a plurality of discs 204 turn loosely on this axle. The central openings in the discs are enough larger than the axle 203 so that the discs ride on the exhibitor, and any disc 204 can drop independently into a depression in the exhibitor, more particularly into a perforation 86'. Assume that as the exhibitor is found from roller 9 onto roller 10, it gets out of alignment so that the perforations 86' are to the right (or left) of the positions shown. Considerable leeway is provided by the plurality of discs mounted on the axle 203, since any one of these discs can drop into contact with the roller portion below, through a perforation 86', without being held up by the other discs riding on the exhibitor. Current flow through each disc 204 is ensured through lateral contacts. The arms 202 carry current as do also a plurality of wires 206 each fixed, as by welding, to the bracket 201 at one end and to the axles 203 at the other.

The operation of the improved apparatus disclosed in the present application takes place with a minimum of supervision; and the positioning of the lines of indicia behind the window 12 is accurately maintained. Such positioning of the exhibitor depends upon the travel of the exhibitor itself; since a perforation must pass beneath the contactor 85 in order that the brake 17 may be applied to stop the movement of the exhibitor. The release of the brake 17 by the breaking of the circuit supplying current thereto as the insulating segment passes beneath the contact points 121 and 122 (or 153 and 154 as the case may be) permits the forward travel of the exhibitor at the proper point in the cycles of operations of the shutters actuated by the cams on the shaft 42 which also drives the circuit breaker members 123 and 147. Of course the perforations in the exhibitor are made of sufficient size to make sure of establishing current flow to the brake 17; however, I have devised such an advantageous arrangement of self-latching relay 129 and such a flexible contactor 85 that the perforations may be quite small. Due to this small size of perforation, the contactor 85 has been passed by the said perforation by the time the points of the circuit breaker have ridden off the insulating segment thereof even though this segment be of quite restricted arc.

The availability of the drive through gears 34 and 82 ready at any time to take up slack in the exhibitor 11 or to bring about its rewinding is an important advantage. It is not necessary to engage the exhibitor by brakes or pressure rollers for maintaining it in taut condition, because the continuous action of the friction clutch 81 insures such condition. Moreover, it is not necessary to engage a clutch or bring gears into mesh in order to bring about rewinding; and accordingly such operation is sure and substantially instantaneous.

The stopping of the exhibitor at the end of a roll is an important safeguard in rendering the operation of the apparatus more nearly fool-proof. No matter what is the position of the switch 106, the passage of current through the contactor 92 prevents the further advance of the exhibitor 11. If the switch 162 is turned for manual control the brake 17 is applied. If the switch is turned for automatic control, the rewinding of the exhibitor takes place automatically.

Further advantages of the present invention have been pointed out in the course of the description or will be more particularly pointed out in the appended claims.

It is not necessary that the sequence relay and the switch 162 be used. These may both be eliminated and the wire 110 permanently connected to the wire 114, and also the wire 161 permanently connected to the wire 165. In this case the exhibitor always comes to a stop at the end of a roll, necessitating movement of the switch 106 to "rewind" position in order that rewinding may take place. With this arrangement, the exhibitor is completely rewound and the eye is disengaged from the hook 47.

While I have illustrated and described the embodiment of my invention which I at present prefer, it will be understood that the invention may be otherwise embodied and practiced within the scope of the following claims.

I claim:

1. In an educational device, the combination with a pair of rollers for an exhibitor of the flexible strip type, one of said rollers being a winding roller and the other a supply roller, of actuating means for said rollers comprising a driving connection to the winding roller, an impositive driving connection to the supply roller, said driving connections being simultaneously operable and being opposed to each other in tending to cause the exhibitor to move in opposite directions, and means for rendering one of said driving connections inoperative.

2. In an educational device, the combination with a pair of rollers for displaying successive portions of an exhibitor of the flexible strip type, of actuating means for said rollers comprising a driving connection to each of said rollers, said driving connections being simultaneously operable and being opposed to each other in tending to so turn said rollers as to move the exhibitor in opposite directions, there being a slip connection in one of said driving connections, and means for releasing the other driving connection from its roller so that the exhibitor may be driven through the driving connection with said slip connection.

3. In an educational device, the combination with a pair of rollers for an exhibitor of the flexible strip type, one of said rollers being a winding roller and the other a supply roller, of driving means for advancing the winding roller step by step and driving means for driving the supply roller continuously including a frictional connection to the supply roller, said driving means being simultaneously operable and tending respectively to so turn said rollers as to cause the exhibitor to move in opposite directions, and means for rendering the driving means for the winding roller inoperative so that the exhibitor may be continuously retracted by said supply roller.

4. In an educational device, the combination with a pair of rollers for an exhibitor of the flexible strip type, one of said rollers being a winding roller and the other a supply roller, of driving means for the winding roller, driving means for the supply roller including a frictional connection to the supply roller, said driving means being simultaneously operable and tending respectively to so turn said rollers as to cause the exhibitor to move in opposite directions, and means for releasing the driving means for the winding roll so as to render the driving means for the supply roll effective.

5. In an educational device, the combination with a roll type exhibitor having means for advancing the exhibitor step by step with a dwell between steps, of actuating means for said advancing means, driving connections between said actuating means and said advancing means including a device for putting said driving connections into operation, and timing means driven by said actuating means for timing the duration of dwell of said exhibitor and controlled as to extent of said steps by the exhibitor itself in traveling.

6. In an educational device, the combination with a roll type exhibitor having means for advancing the exhibitor step by step with a dwell between steps, of actuating means for said advancing means, driving connections between said actuating means and said advancing means including a device for putting said driving connections into operation, and a plurality of timing means driven by said actuating means for timing selectively a longer or shorter duration of dwell of said exhibitor and each controlled as to extent of said steps by the exhibitor itself in travelling, so as to obtain the same step with any of said timing means.

7. In an educational device, in combination, a pair of rollers for displaying successive portions of an exhibitor of the flexible strip type, shutters for blanking out each a section of the portion of the exhibitor displayed, means for operating the shutters, actuating means for said rollers comprising a driving connection to each roller, said driving connections being simultaneously operable and opposed to each other in tending to cause the exhibitor to move in opposite directions, the driving connection to the reverse driving roller being impositive, means for halting said exhibitor while said first mentioned means and said impositive driving connection continue to operate, and means for releasing the forward driving roller from its driving connection to reverse the movement of the exhibitor.

8. In an educational device, in combination, a pair of rollers for displaying successive portions of an exhibitor of the flexible strip type, shutters for blanking out each a section of the portion of the exhibitor displayed, means for operating the shutters, actuating means for said rollers comprising a driving connection to each roller, said driving connections being simultaneously operable and opposed to each other in tending to cause the exhibitor to move in opposite directions, means for rendering one of said driving connections inoperative while said first mentioned means continues to operate the shutters, the other of said driving connections being impositive, a brake for maintaining the exhibitor stationary while said driving connection is inoperative, and means for releasing the corresponding roller from both said brake and said driving means to permit said impositive driving means to reverse the travel of the exhibitor.

9. In an educational device, in combination, a roll type exhibitor bearing indicia in a plurality of lines, shutters for blanking out portions of a line on the exhibitor, means for operating the shutters, actuating means for the exhibitor, and driving connections for advancing the exhibitor in the forward direction either intermittently or continuously selectively.

10. In an educational device, in combination, a pair of rollers for displaying successive portions of an exhibitor of the flexible strip type, actuating means therefor including driving connections to the rollers for advancing the exhibitor in the forward direction either intermittently or continuously selectively, shutters for blanking out each a section of the portion of the exhibitor displayed, means for operating the shutters, and means for automatically stopping the advance of the exhibitor in the forward direction adjacent the end of the exhibitor whether the actuating means be connected for intermittent advance or for continuous advance.

11. In an educational device, the combination with a pair of rollers for an exhibitor of the flexible strip type, one of said rollers being a winding roller and the other a supply roller, of driving means for the winding roller, driving means for the supply roller including a frictional connection to the supply roller, said driving means being simultaneously operable and tending respectively to so turn said rollers as to cause the exhibitor to move in opposite directions, and means for automatically releasing the winding roller from its driving means adjacent the end of the exhibitor to effect rewinding of the exhibitor.

12. In an educational device, the combination with a pair of rollers for displaying successive portions of an exhibitor of the flexible strip type, one of said rollers being a winding roller and the other a supply roller, of means for rotating the winding roller step by step with a dwell between steps, driving means for the supply roller including a frictional connection to the supply roller, said means being simultaneously operable and tending respectively to so turn said rollers as to cause the exhibitor to move in opposite directions, and means for automatically releasing the winding roller from its rotating means adjacent the end of the exhibitor.

13. In an educational device, the combination as claimed in claim 12 in which the intermittent rotating means for the winding roller includes a device for holding the winding roller stationary during its periods of dwell.

14. In an educational device, the combination with a pair of rollers for displaying successive portions of an exhibitor of the flexible strip type, one of said rollers being a winding roller and the other a supply roller, of actuating means for said rollers comprising a driving connection to the winding roller for advancing the exhibitor intermittently, a driving connection to the supply roller, and means effective adjacent the end of the exhibitor for changing from intermittent advance of the exhibitor by the winding roller to continuous drive of the exhibitor by the supply roller in the reverse direction and effective adjacent the beginning of the exhibitor for changing back to intermittent advance of the exhibitor by the winding roller.

15. In an educational device, the combination with a pair of rollers for displaying successive portions of an exhibitor of the flexible strip type, of actuating means for said rollers comprising a driving connection to each of said rollers, said driving connections being simultaneously operable and being opposed to each other in tending to so turn said rollers as to move the exhibitor in opposite directions, there being a slip connection in one of said driving connections, and means effective adjacent one end of the exhibitor for automatically releasing the other driving connection and effective adjacent the other end of the exhibitor for automatically restoring the released driving connection.

16. In an educational device, the combination with a pair of rollers for displaying successive portions of an exhibitor of the flexible strip type, one of said rollers being a winding roller and the other a supply roller, of actuating means for said rollers comprising a driving connection to the winding roller for advancing the exhibitor intermittently, a driving connection to the supply roller for rewinding the exhibitor continuously, and means actuated adjacent the end of the exhibitor for selectively stopping the exhibitor or rendering the driving connection to the supply roller effective for rewinding the exhibitor.

17. In an educational device, the combination with a pair of rollers for an exhibitor of the flexible strip type, of means for intermittently rotating one of said rollers, and driving means connected to the other roller by a slip connection for driving the exhibitor continuously in the reverse direction, said first mentioned means comprising a clutch and a device for holding the respective roller stationary, said clutch and device being alternatively operable.

18. In an educational device, the combination with a pair of rollers for an exhibitor of the flexible strip type, one of said rollers being a winding roller and the other a supply roller, of actuating means for the winding roller comprising a clutch and a brake alternatively operable to intermittently rotate and hold stationary the winding roller, driving means connected to the supply roller by a slip connection for rewinding the exhibitor, and means for simultaneously releasing both said clutch and said brake to render said driving means operative to rewind the exhibitor.

19. An educational device comprising in combination with an exhibitor having inequalities therein for controlling its travel, means for intermittently advancing the exhibitor, and electrical means for controlling said advancing means including a contactor having a plurality of elements arranged side by side for dropping independently into a depression in the exhibitor.

20. In an educational device, the combination with a pair of rollers for displaying successive portions of an exhibitor of the flexible strip type, of actuating means for said rollers comprising a driving connection to each roller, said driving connections being simultaneously operable and being opposed to each other in tending to cause the exhibitor to move in opposite directions, and means for releasing one of said rollers from its driving connection so the other roller may draw in the exhibitor, the driving connection to said last mentioned roller being yieldable to permit withdrawal of the exhibitor therefrom when the two driving connections are simultaneously operative.

21. In an educational device, in combination, means including a roller for displaying successive portions of an exhibitor, shutters for blanking out each a section of the portion of the exhibitor displayed, means for operating the shutters, and means for operating said roller including a releasable driving connection thereto and a brake for maintaining said roller stationary while released, said shutters continuing to operate while said roller is thus released and braked.

22. In an educational device, in combination, a roll type exhibitor bearing indicia in a plurality of lines, shutters for blanking out each a section of a line on the exhibitor, means for operating the shutters in sequence in the direction of reading, and means for advancing the exhibitor in the forward direction either intermittently or continuously at the selection of the operator.

23. In an educational device, the combination as claimed in claim 22 having means for automatically stopping the advance of the exhibitor in the forward direction adjacent the end of the exhibitor whether being advanced intermittently or continuously.

24. In an educational device the combination as claimed in claim 18 in which the exhibitor adjacent its end automatically actuates the means for releasing the clutch and brake.

CARL C. TAYLOR.